United States Patent
Kray et al.

(10) Patent No.: US 11,788,549 B2
(45) Date of Patent: Oct. 17, 2023

(54) TURBOFAN BLADE BLOCKING APPARATUS

(71) Applicant: GENERAL ELECTRIC COMPANY, Schenectady, NY (US)

(72) Inventors: Nicholas J. Kray, Evendale, OH (US); Brandon W. Miller, West Chester, OH (US); Egbert Geertsema, Evendale, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/493,600

(22) Filed: Oct. 4, 2021

(65) Prior Publication Data

US 2023/0108929 A1 Apr. 6, 2023

(51) Int. Cl.
*F04D 29/52* (2006.01)
*F04D 19/00* (2006.01)

(52) U.S. Cl.
CPC ......... *F04D 29/522* (2013.01); *F04D 19/002* (2013.01)

(58) Field of Classification Search
CPC ............................ F04D 29/522; F04D 19/002
See application file for complete search history.

(56) References Cited

U.S. PATENT DOCUMENTS

| | | | |
|---|---|---|---|
| 7,121,758 B2 | 10/2006 | McMillan et al. | |
| 8,403,624 B2 | 3/2013 | Xie et al. | |
| 8,888,439 B2 | 11/2014 | Harper et al. | |
| 8,926,263 B2 | 1/2015 | Reed et al. | |
| 9,222,368 B2 | 12/2015 | Harper et al. | |
| 9,677,417 B2 | 6/2017 | Drozdz | |
| 10,472,985 B2 | 11/2019 | Khare et al. | |
| 2018/0066675 A1* | 3/2018 | Kappes | F01D 21/04 |
| 2018/0163562 A1* | 6/2018 | Khare | F01D 25/24 |
| 2018/0202460 A1* | 7/2018 | Kray | F04D 29/526 |
| 2018/0298782 A1* | 10/2018 | Waldman | F04D 29/526 |
| 2020/0011203 A1* | 1/2020 | Prabhakar | F01D 25/005 |
| 2020/0123925 A1* | 4/2020 | Finlayson | F01D 21/045 |
| 2020/0123976 A1 | 4/2020 | Finlayson et al. | |
| 2021/0164357 A1* | 6/2021 | Felske | F01D 9/041 |
| 2022/0333496 A1* | 10/2022 | Dupays | F04D 29/522 |

* cited by examiner

*Primary Examiner* — Aaron R Eastman
(74) *Attorney, Agent, or Firm* — HANLEY, FLIGHT & ZIMMERMAN, LLC

(57) ABSTRACT

Turbofan blade blocking apparatus are disclosed. An example turbofan engine includes a containment casing, a fan, at least one of a trench filler or an abradable layer at least partially aligned with the fan in an axial direction defined by the turbofan engine, at least one of the trench filler or the abradable layer fixed to an inner radial surface of the containment casing, and a metal blocker coupled to the containment casing forward of the fan, an aft end of the metal blocker interfacing with at least one of the trench filler or the abradable layer.

20 Claims, 11 Drawing Sheets

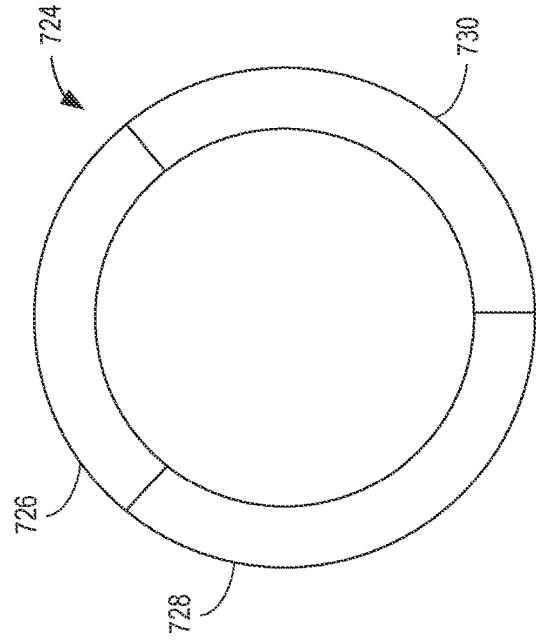
FIG. 7B
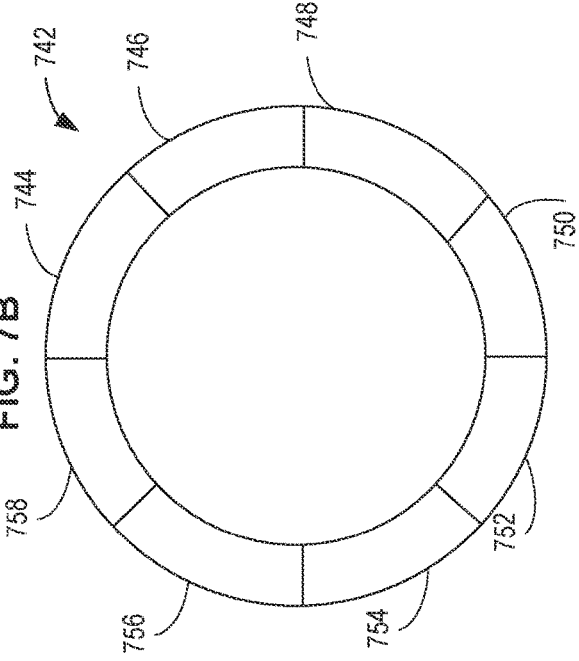
FIG. 7D
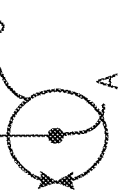
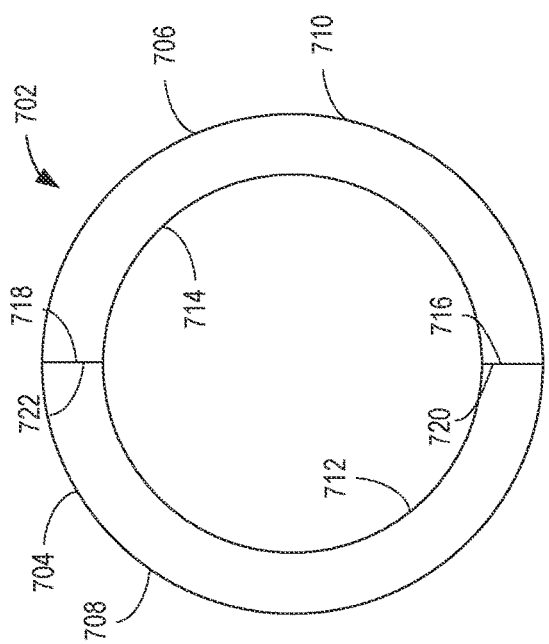
FIG. 7A
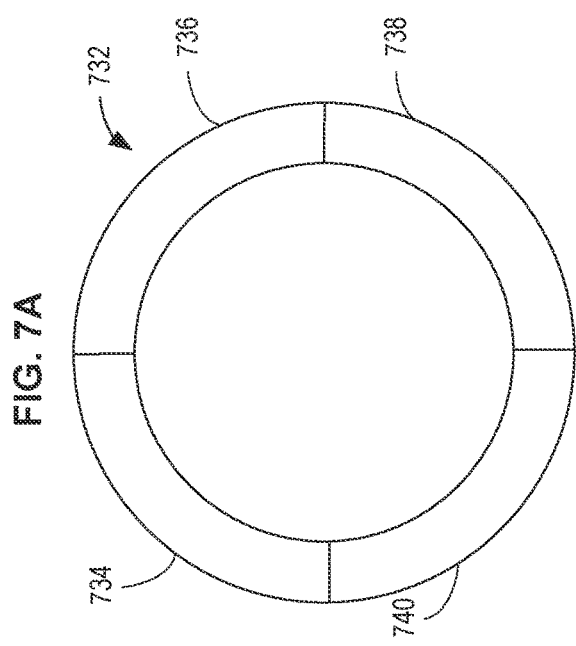
FIG. 7C

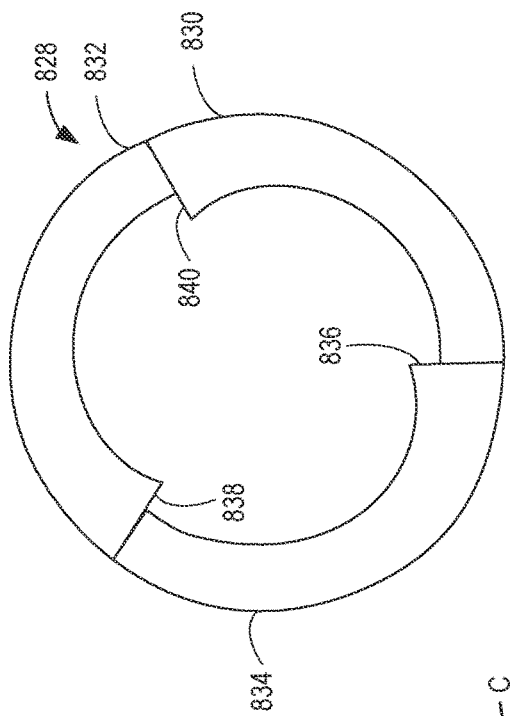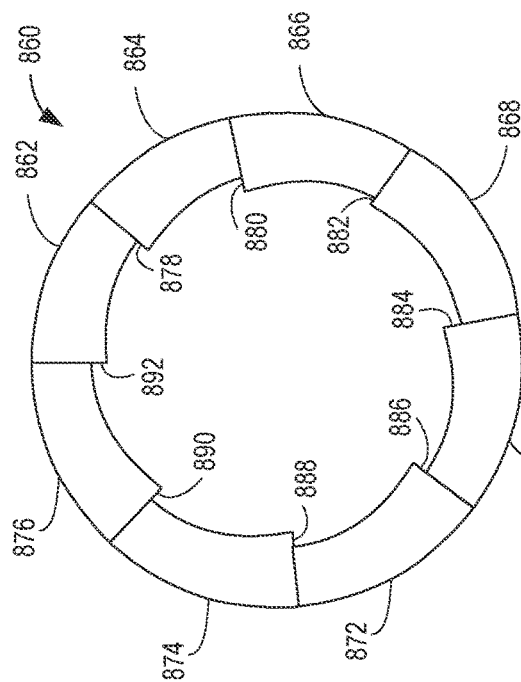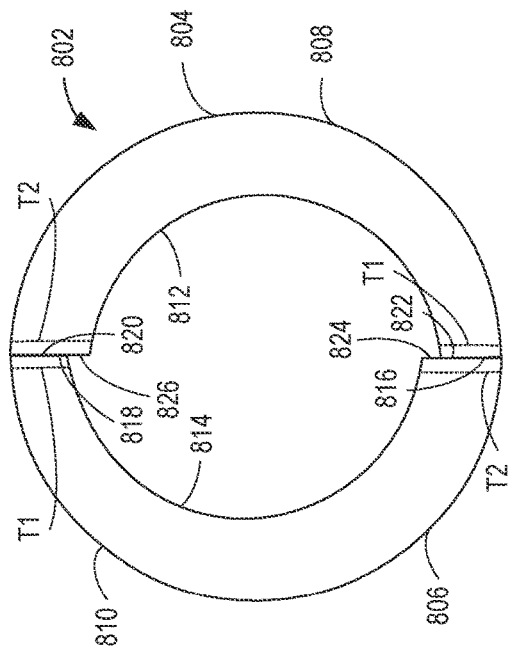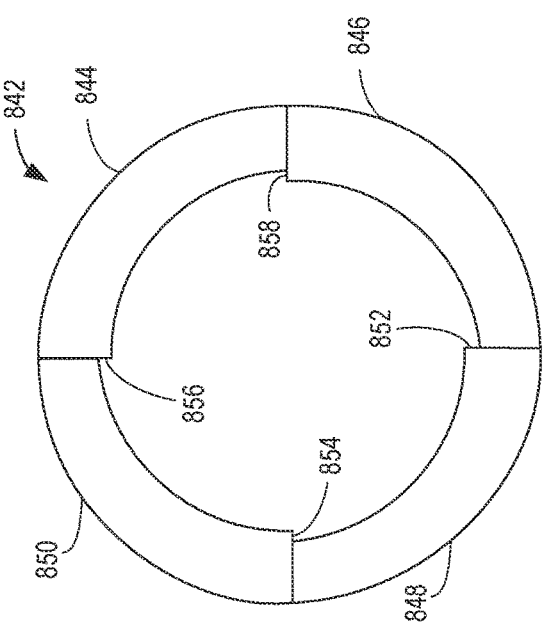

US 11,788,549 B2

1

TURBOFAN BLADE BLOCKING APPARATUS

FIELD OF THE DISCLOSURE

This disclosure relates generally to turbofan engines and, more particularly, to turbofan blade blocking apparatus.

BACKGROUND

Aircraft sometimes encounter situations that endanger the thrust capabilities of associated propellers, such as when a fan blade of a propeller ruptures and/or is released from an associated retention disk (e.g., a fan blade out condition). A thrust capability of the aircraft is vital to the functions of the aircraft and the safety of its passengers. As such, aircraft often utilize protection to limit the damage on the propeller and associated components when a fan blade out condition occurs.

BRIEF DESCRIPTION OF THE DRAWINGS

FIGS. 7A-D illustrate example cross-sectional views of a plurality of the example blade blocking apparatus of FIGS. 3, 4, and/or 5 implemented in example turbofan engines.

FIGS. 8A-D illustrate example cross-sectional views of a plurality of the example blade blocking apparatus of FIGS. 3, 4, and/or 5 implemented in example turbofan engines.

The figures are not to scale. In general, the same reference numbers will be used throughout the drawing(s) and accompanying written description to refer to the same or like parts.

DETAILED DESCRIPTION

Figure 1:
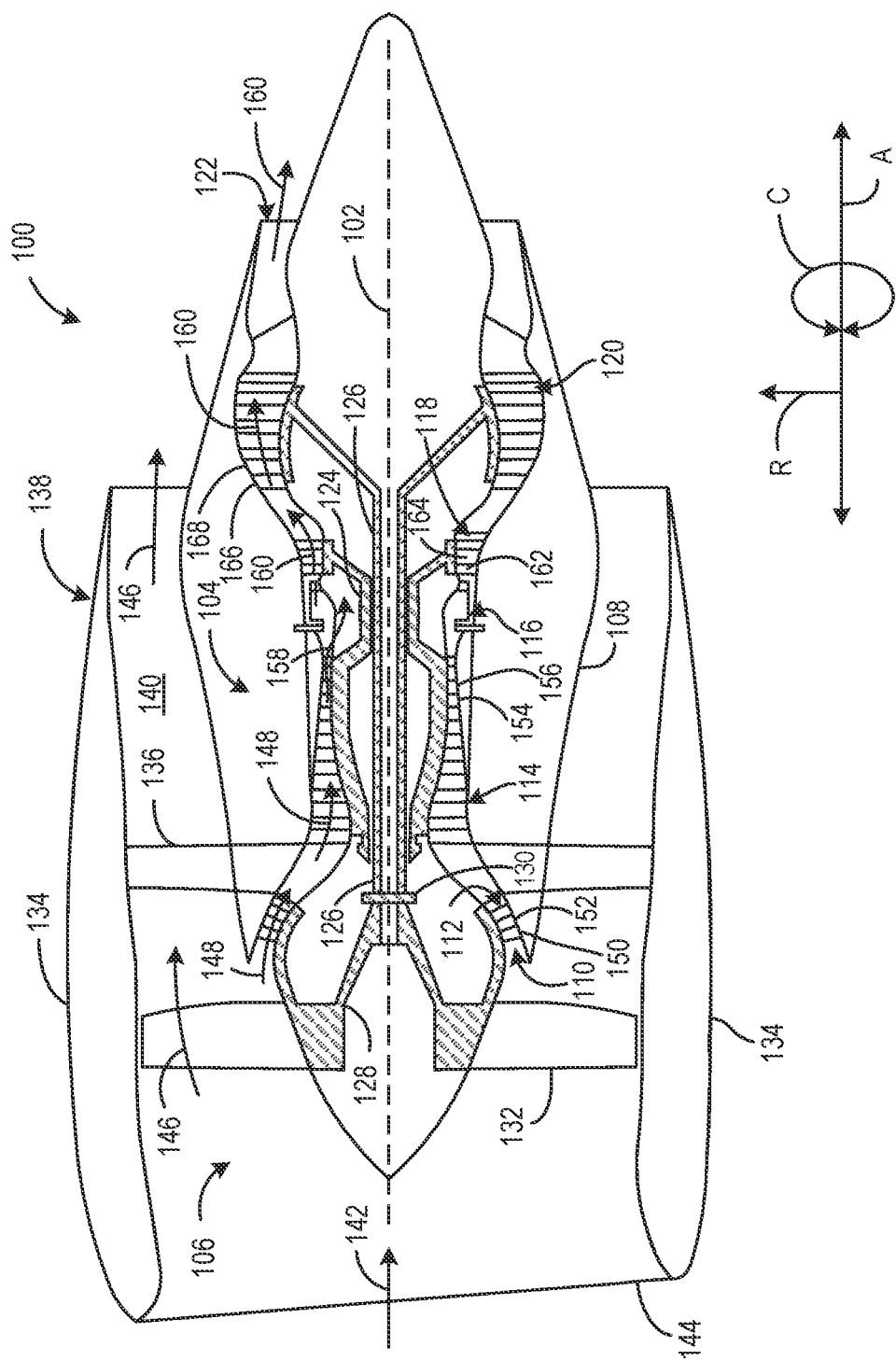
FIG. 1 illustrates a schematic cross-sectional view of a prior art example of a turbofan engine.

Federal Aviation Administration (FAA) regulation 33.94 requires a turbofan engine of an aircraft to safely demonstrate a blade release from an associated retention disk (e.g., a fan blade out condition, windmilling imbalance). For example, the turbofan engine must be able to contain the loose fan blade and/or fragments thereof without catching fire and without failure of associated mounting attachments when the engine operates for at least 15 seconds after the blade release or rupture. To that end, it is important to arrest forward movement of the loose fan blade fragments as, in such instances, the fan blade fragments can be ingested by the engine risking possible fire and/or damage to the engine mounts. As a result, the damage caused by ingesting the forward-traveling fan blade fragments can compromise the structural integrity of an inlet cowl of the engine causing portions of the inlet cowl to detach. Additionally, the fan blade fragments that travel forward can damage engine inlets and/or nacelles. Furthermore, in response to escaping through the forward end of the engine, the fan blade fragments can damage the fuselage, wing, empennage, and/or another engine of an aircraft.

In some examples, when a fan blade out (FBO) event occurs, loose fan blade fragmentation becomes embedded into an abradable layer and/or a trench filler that is positioned around a perimeter of the fan. However, when the fragmentation enters the abradable layer and/or the trench filler, circumferential motion of the fan blade can cause the fragmentation to travel forward through the abradable layer and/or the trench filler. While the abradable layer and/or trench filler absorb energy from the fan blade fragmentation, high velocities of the released fan blade (e.g., 1,500 feet per second) can cause the fragmentation to tear through the abradable layer and/or the trench filler. As a result, the fan blade fragmentation can escape through a forward end of the trench filler and/or the abradable layer resulting in an uncontained forward release of the fragmentation and, in some instances causing detachment of the inlet cowl.

In some examples, to arrest forward movement of loose fan blades, a hook is implemented to extend radially inward at a forward end of a casing of the engine. In some examples, the engine includes a void aft of the hook to contain the loose fan blade fragmentation. In some examples, the front hooks are utilized to contain fan blade fragmentation in engines operating at lower speeds as the fragmentation does not enter a surface around the fan due to reduced circumferential velocities. However, fan blade fragmentation traveling at higher velocities may rupture the hook allowing an uncontained forward release of the fan blade fragmentation. Moreover, as the hook extends radially inward at the forward end of the engine, the fan blade fragmentation has ample space to re-enter the flow path of the engine aft of the hook and, in turn, can travel past the hook through the inlet of the engine. Additionally, the hook can deflect the fan blade fragmentation unpredictably and without significantly reducing a velocity thereof when followed by a void and, thus, the fragmentation may re-enter the flow path of the engine and cause damage to components of the engine as the rotation of the remaining fan blades ingests the fragmentation.

Examples disclosed herein provide turbofan blade blocking apparatus to block forward travel and/or release of fan blade fragmentation. In certain examples, metal blocker segments (e.g., metal blockers, blocker segments, etc.) span along an inner circumference (e.g., an inner radial surface) of a nacelle of an aircraft engine. Specifically, the metal blocker segments are positioned forward of a fan of the aircraft engine and define a boundary of a flow path of the engine forward of the fan. In some examples, the inner radial surfaces of the metal blocker segments are flush (e.g., even, level, flat, etc.) in a circumferential direction defined by the aircraft engine and define a smooth boundary for the flow path. In some examples, the inner radial surfaces are jagged or stepped in the circumferential direction defined by the aircraft engine.

In certain examples, the metal blocker segments are rigidly coupled to the nacelle via mechanical fasteners. In certain examples, aft ends of the metal blocker segments interface with an abradable layer and/or a trench filler of the aircraft engine. In certain example, the abradable layer and/or the trench filler are at least partially aligned with a rotational plane of the fan.

In certain examples, the metal blocker segments include rigid walls that have a higher impact strength than the abradable layer and/or the trench filler. For example, the rigid walls can be formed from a thick metallic material. In certain examples, the metal blocker segments include a hollow interior or a partially hollow interior. For example, the metal blocker segments can include an internal cavity and/or an internal structure (e.g., a structural lattice, a honeycomb structure, a gyroid structure, etc.) within the internal cavity.

When an FBO event occurs, a radial velocity of fan blade fragmentation causes the fragmentation to enter the abradable layer and/or the trench filler. Further, a circumferential velocity and/or an axial velocity of the fan blade fragmentation causes the fragmentation to travel forward through the abradable layer and/or the trench filler. Advantageously, the aft ends of the metal blocker segments block the fan blade fragmentation in response to the fragmentation encountering a forward end for the abradable layer and/or trench filler. As a result, the metal blocker segments arrest the forward travel of the fragmentation and deflect the fragmentation towards an aft end of the aircraft engine causing the fragmentation to remain embedded within the trench filler and/or the abradable layer. In certain examples, the aft ends of the metal blocker segments are positioned aft of an inlet cowl associated with the aircraft engine and, thus, prevent the inlet cowl from separating from the aircraft engine as a result of the FBO event. Accordingly, the metal blocker segments protect the aircraft engine and an associated aircraft from damage that can result from forward release of a loose fan blade.

In some examples, the aft ends of the metal blockers are substantially parallel to the rotational plane of the fan. In some examples, the aft ends of the metal blocker segments are contoured to prevent the fragmentation from entering the flow path of the turbofan engine in response to deflecting off the metal blocker. In some examples, the aft ends of the metal blocker segments are concave. In such examples, the trench filler and/or abradable material extends into a space defined by the concavity of the aft ends of the metal blocker segments. In some examples, the aft ends of the metal blocker segments are canted to deflect fragmentation partially radially outward and, thus, away from the flow path of the turbofan engine. In some examples, a shape of the aft ends of the metal blockers is based on a material of the fan blades and/or operating speeds associated with the fan.

Referring now to the drawings, FIG. 1 is a schematic cross-sectional view of a prior art example of a turbofan engine (e.g., an aircraft engine) 100 that may incorporate various examples disclosed herein. As shown in FIG. 1, the turbofan engine 100 defines a longitudinal or axial centerline axis 102 extending therethrough for reference. In general, the turbofan engine 100 can include a core turbine or a core turbine engine 104 disposed downstream from a fan section 106.

The core turbine engine 104 can generally include a substantially tubular outer casing 108 that defines an annular inlet 110. The outer casing 108 can be formed from multiple segments. The outer casing 108 encloses, in serial flow relationship, a compressor section having a booster or low-pressure compressor 112 ("LP compressor 112") and a high-pressure compressor 114 ("HP compressor 114"), a combustion section 116, a turbine section having a high-pressure turbine 118 ("HP turbine 118") and a low-pressure turbine 120 ("LP turbine 120"), and an exhaust section 122. A high-pressure shaft or spool 124 ("HP shaft 124") drivingly couples the HP turbine 118 and the HP compressor 114. A low-pressure shaft or spool 126 ("LP shaft 126") drivingly couples the LP turbine 120 and the LP compressor 112. The LP shaft 126 can also couple to a fan shaft or spool 128 of the fan section 106. In some examples, the LP shaft 126 can couple directly to the fan shaft 128 (e.g., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 ("fan" 132) coupled to and extending radially outwardly from the fan shaft 128. An annular fan casing or nacelle 134 circumferentially encloses the fan section 106 and/or at least a portion of the core turbine engine 104. The nacelle 134 can be supported relative to the core turbine engine 104 by a forward mount 136. Furthermore, a downstream section 138 of the nacelle 134 can enclose an outer portion of the core turbine engine 104 to define a bypass airflow passage 140 therebetween.

As illustrated in FIG. 1, air 142 enters an intake or inlet portion 144 of the turbofan engine 100 during operation thereof. A first portion 146 of the air 142 flows into the bypass airflow passage 140, while a second portion 148 of the air 142 flows into the annular inlet 110 of the LP compressor 112. One or more sequential stages of LP compressor stator vanes 150 and LP compressor rotor blades 152 (e.g., turbine blades) coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 where one or more sequential stages of HP turbine stator vanes 162 and HP turbine rotor blades 164 coupled to the HP shaft 124 extract a first portion of kinetic and/or thermal energy therefrom. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine engine 104 through the exhaust section 122 thereof.

Along with the turbofan engine 100, the core turbine engine 104 serves a similar purpose and sees a similar environment in land-based turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) can be included between any shafts and spools. For example, the reduction gearbox 130 can be disposed between the LP shaft 126 and the fan shaft 128 of the fan section 106.

As depicted therein, the turbofan engine 100 defines an axial direction A, a radial direction R, and a circumferential direction C. In general, the axial direction A extends generally parallel to the axial centerline axis 102, the radial direction R extends orthogonally outward from the axial centerline axis 102, and the circumferential direction C extends concentrically around the axial centerline axis 102.

Figure 2:
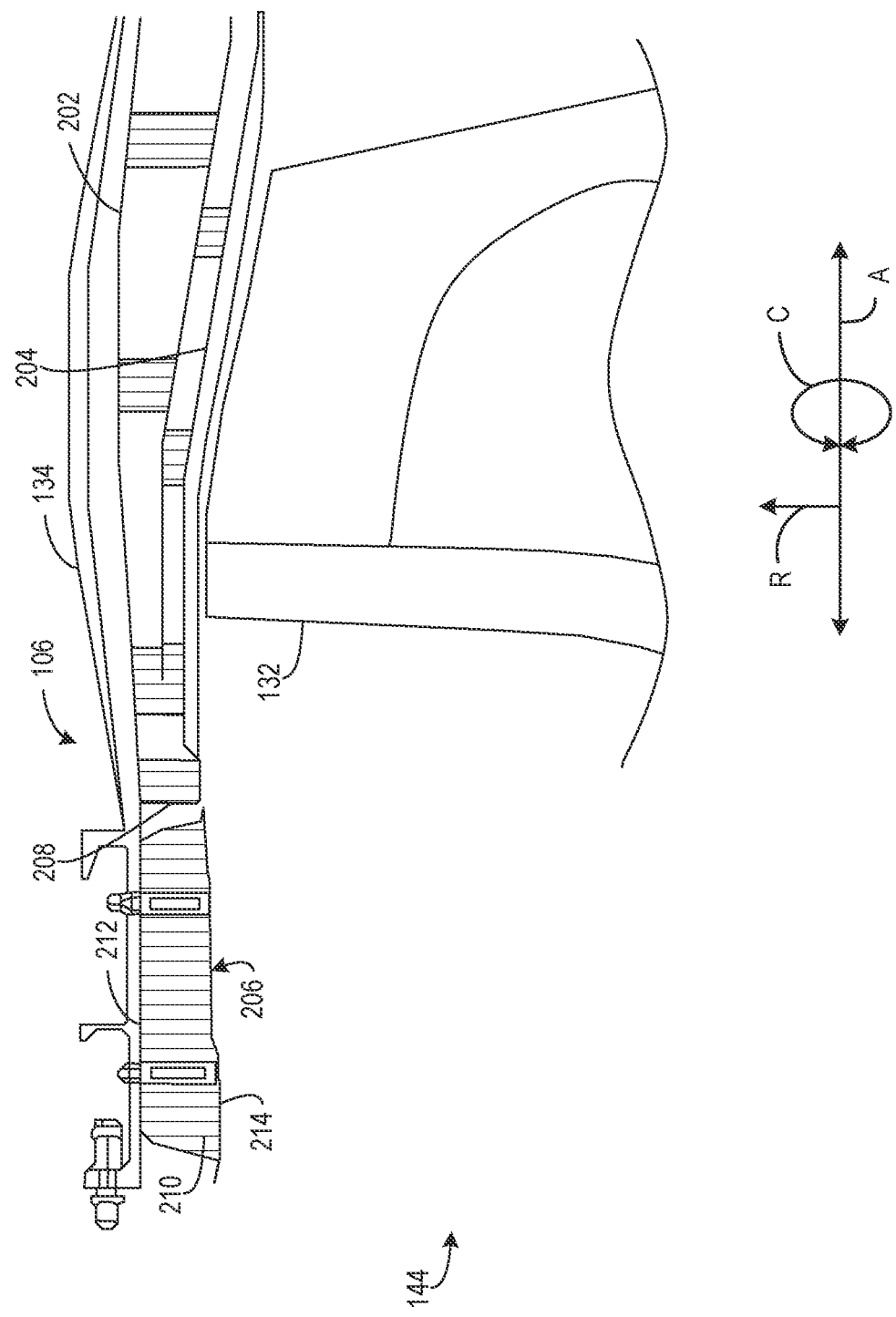
FIG. 2 illustrates a forward portion of the example prior art turbofan engine of FIG. 1.

FIG. 2 illustrates a prior art example of an acoustic panel of a turbofan engine. More particularly, FIG. 2 illustrates a partial cross-sectional view of the fan section 106 of the turbofan engine 100 of FIG. 1. In the illustrated example of FIG. 2, the turbofan engine 100 includes a trench filler 202, an abradable lining 204, and an acoustic panel 206. In FIG. 2, the trench filler 202 and the acoustic panel 206 are coupled to the nacelle 134. In FIG. 2, the abradable lining 204 is coupled to the trench filler 202 opposite the nacelle 134. In FIG. 2, the trench filler 202 and the abradable lining 204 are aligned with the fan blades 132 in the radial direction R defined by the turbofan engine 100. In FIG. 2, the acoustic panel 206 is disposed forward of the trench filler 202 and the abradable lining 204. In the illustrated example of FIG. 2, the acoustic panel 206 attenuates acoustic waves produced by the fan 132 and/or by air entering the inlet portion 144 of the turbofan engine 100.

When the turbofan engine 100 encounters a FBO event, fragments of the fan blades 132 detach from the fan shaft 128 of FIG. 1 with a high velocity in the radial direction and the circumferential direction and, in some instances, a velocity in the axial direction. As such, the radial velocities may cause the fragments of the fan blades 132 to enter the trench filler 202 and the abradable lining 204. Further, the circumferential velocity and/or the axial velocity can cause the fragments to travel through a forward end 208 of the abradable lining 204 and the trench filler 202. As such, the fragments of the fan blades 132 can impact the acoustic panel 206.

However, the acoustic panel 206 is formed from relatively low impact strength materials, such as a honeycomb structure 210 positioned between a backing plate 212 and a perforated sheet 214. As a result, the high velocities that result from the FBO event cause fragments of the fan blades 132 to tear through the acoustic panel 206 and escape the turbofan engine 100 through the inlet portion 144. Additionally, the fragments of the fan blades 132 can detach and/or rupture other parts of the turbofan engine 100, such as an inlet cowl (e.g., a forward portion of the nacelle 134), furthering the debris that results from the FBO event. In turn, the forward release of the fragments of the fan blades 132 and/or other debris can be ingested by the turbofan engine 100 after escaping and, thus, cause further damage to the engine. Additionally or alternatively, the forward release of the fragments of the fan blades 132 can impact other parts of an associated aircraft, such as a wing, a fuselage, an empennage, and/or another engine. Accordingly, the FBO event can be catastrophic for the turbofan engine 100 as well as the rest of the aircraft.

Figure 3:
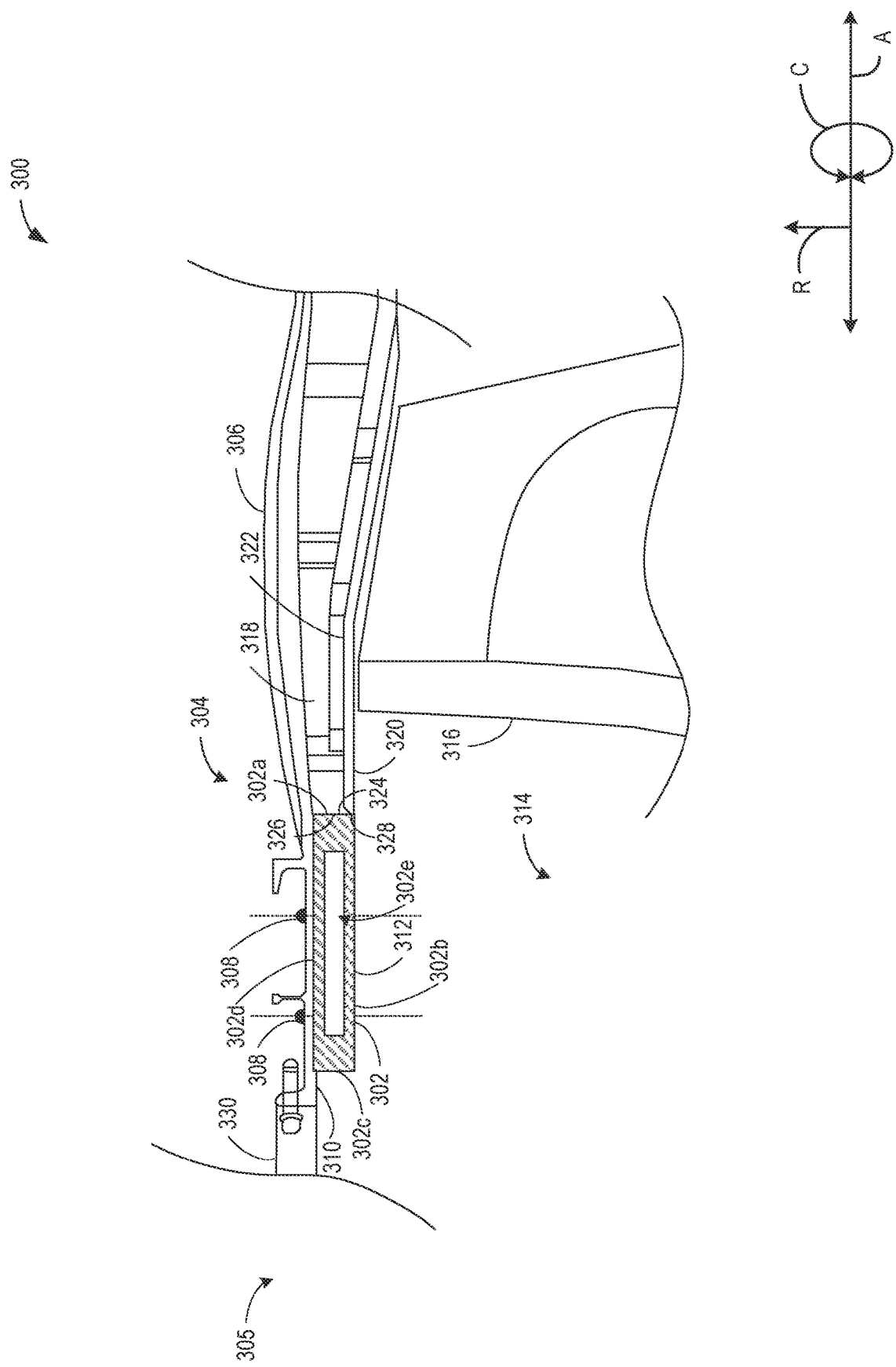
FIG. 3 illustrates a partial cross-sectional view of an example turbofan engine having an example blade blocking apparatus in accordance with the teachings disclosed herein.

FIG. 3 illustrates a partial cross-sectional view of an example turbofan engine (e.g., an aircraft engine) 300 having an example metal blocker (e.g., a blade blocking apparatus, metal blocking segments, etc.) 302 to address the dangers and deficiencies of the design of FIG. 2 in accordance with the teachings disclosed herein. Specifically, the partial cross-sectional view of the illustrated example is representative of an example fan section 304 of the turbofan engine 300 (e.g., the fan section 106 of FIGS. 1 and 2) proximate to a front end 305 of the turbofan engine 300.

In the illustrated example of FIG. 3, the metal blocker 302 is coupled to a containment casing (e.g., a nacelle) 306 of the turbofan engine 300. For example, the metal blocker 302 can be coupled to the containment casing 306 via mechanical fasteners (e.g., rivets, bolts, nuts, screws, etc.) 308. In some examples, a plurality of the metal blocker 302 spans along an inner radial surface 310 of the containment casing 306. For example, the plurality of the metal blocker 302 can form a ring that is coaxial to the containment casing 306. Accordingly, inner radial surfaces 312 of the plurality of the metal blocker 302 define a boundary of a portion of an axial flow path 314 in the turbofan engine 300.

In FIG. 3, an exterior of the metal blocker 302 is formed by solid walls (e.g., solid metal walls) 302a, 302b, 302c, 302d. In FIG. 3, the metal blocker 302 includes an internal cavity 302e between the solid walls 302a, 302b, 302c, 302d that are interconnected. In some examples, the metal blocker 302 includes the internal cavity 302e to reduce a weight of the turbofan engine 300. In some examples, the metal blocker 302 includes an internal structure, such as a structural lattice and/or a truss, within the internal cavity 302e to provide increased structural support between the solid walls 302a, 302b, 302c, 302d.

In FIG. 3, the turbofan engine 300 includes fan blades (e.g., a fan) 316 within the containment casing 306, a trench filler 318 fixed to the inner radial surface 310 of the containment casing 306, and an abradable layer 320 fixed to an inner radial surface 322 of the trench filler 318. In FIG. 3, the fan blades 316 are aligned with the trench filler 318 and the abradable layer 320 in a radial direction R defined by the turbofan engine 300. Specifically, the abradable layer 320 is positioned between the fan blades 316 and the trench filler 318 to absorb friction that may occur due to a rotation of the fan blades 316 and, thus, prevents the fan blades 316 from encountering wear.

In FIG. 3, an aft end 324 the metal blocker 302 is positioned proximate to, and interfaces with, a forward end 326 of the trench filler 318 and a forward end 328 of the abradable layer 320. In some examples, the aft end 324 of the metal blocker 302 is positioned between the fan 316 and an aft end of an inlet cowl 330 associated with the containment casing 306. In FIG. 3, a radial thickness of the aft end 324 of the metal blocker 302 is approximately equivalent to a radial thickness of the forward end 326 of the trench filler and the forward end 328 of the abradable layer combined.

In the illustrated example of FIG. 3, when an FBO event occurs, one or more of the fan blades 316 are ruptured and, in turn, fragments of the fan blade(s) 316 break off and are launched or released with a high velocity in the radial direction R and the circumferential direction C. In FIG. 3, the abradable layer 320 and/or the trench filler 318 receive the fragments as a result of the high velocity in the radial direction R and absorb some of the kinetic energy from the fragments. However, the high velocity in the circumferential direction C, and/or a velocity in the axial direction A that results from the rupture of the fan blade(s) 316, causes the fragments of the fan blade(s) 316 to tear through the trench filler 318 and/or the abradable layer 320 and travel toward the forward end 305 of the turbofan engine 300. While the trench filler 218 and the abradable layer 220 can absorb some of the kinetic energy from the fragments of the fan blade(s) 316, the high velocity of the fragments of the fan blade(s) 316 can exceed the energy absorption capabilities of the trench filler 218 and the abradable layer 220. As a result, the fragments of the fan blade(s) 316 travel to the forward end 326, 328 of the trench filler 218 and/or the abradable layer 220.

In FIG. 3, the aft end 324 of the metal blocker 302 blocks the forward travel of the fragments in response to the fragments reaching the forward end 326, 328 of the trench filler 218 and/or the abradable layer 220. Specifically, a high impact strength of the metal blocker 302 enables the metal blocker 302 to absorb a portion of the kinetic energy of the fragments as the metal blocker 302 deflects the fragments away from the forward end 305 (e.g., toward an aft end) of the turbofan engine 300 at a reduced velocity. As such, the fragments remain embedded in the trench filler 318 and/or the abradable layer 320, which continue to absorb energy as the fragments of the fan blade(s) 316 travel therethrough and, in turn, arrest movements of the fragments. Accordingly, the metal blocker 302 blocks the fragments of the fan blade(s) 316 from escaping forward through the trench filler 218 and the abradable layer 220 and, thus, prevents the fragments of the fan blade(s) 316 that enter the abradable layer 220 and/or the trench filler 318 from traveling past the forward end 305 of the turbofan engine 300, which would otherwise cause catastrophic damage to the turbofan engine 300 and/or other parts of an associated aircraft.

In some examples, an aft wall 302a and a forward wall 302c of the metal blocker 302 have an increased thickness compared to an inner radial wall 302b and an outer radial wall 302d of the metal blocker 302 to increase the impact strength of the metal blocker 302 in areas that encounter impact while minimizing or otherwise reducing the weight thereof. To that end, in some examples, the aft wall 302a has an increased thickness compared to the forward wall 302c to enable the metal blocker 302 to provide a localized increased rigidity at the interface between the metal blocker 302 and the trench filler 318 and the abradable layer 320. As such, the increased thickness of the aft wall 302a enables greater impact absorption by the aft wall 302a while the reduced thickness of the forward wall 302c reduces a weight of the metal blocker 302.

Figure 4:
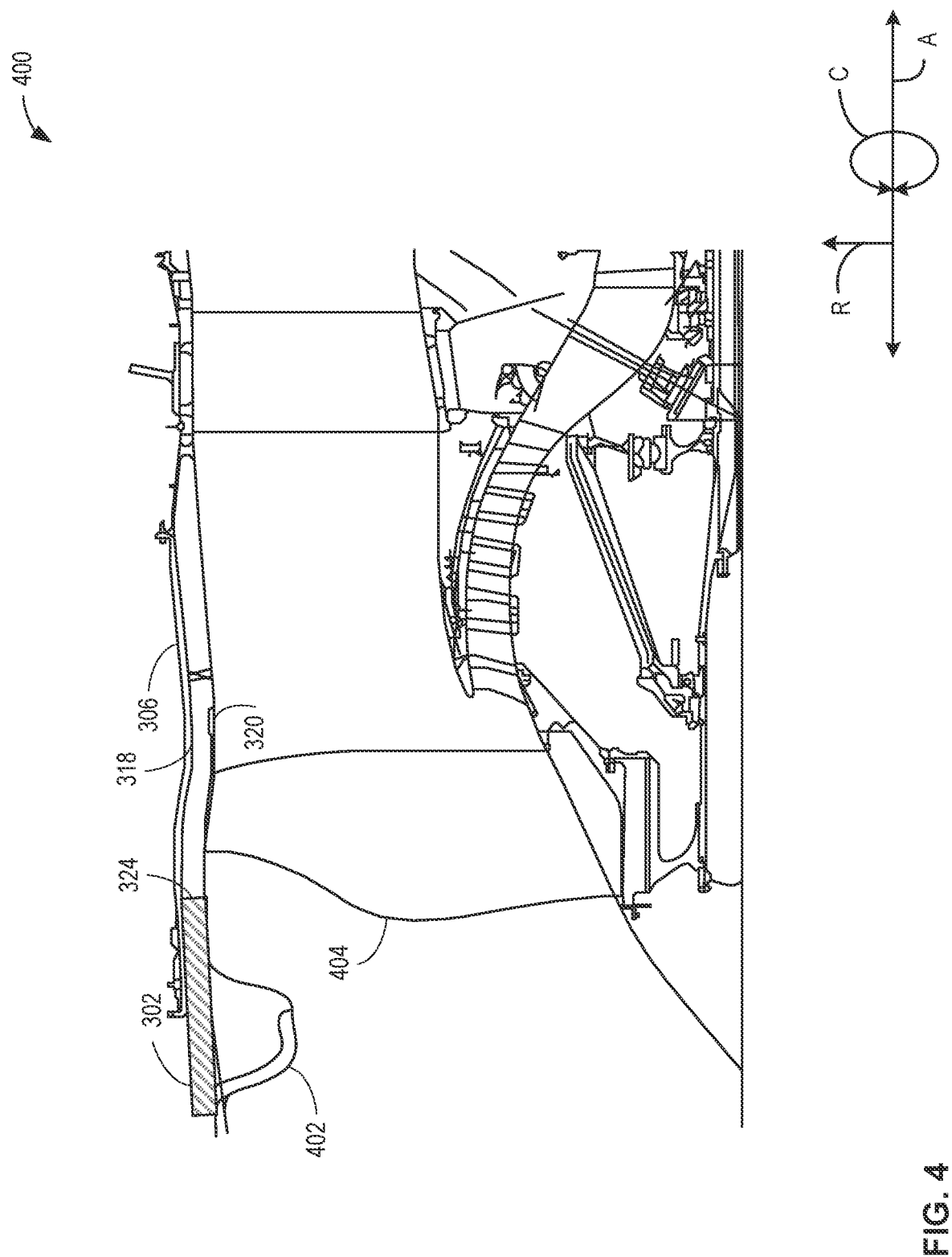
FIG. 4 illustrates a partial cross-sectional view of another example turbofan engine have the example blade blocking apparatus of FIG. 3.

FIG. 4 illustrates a partial cross-sectional view of another example turbofan engine 400 including the example metal blocker 302. In the illustrated example of FIG. 4, the turbofan engine 400 includes a part span inlet guide vane 402. In FIG. 4, the part span inlet guide vane 402 is coupled to the metal blocker 302. For example, the part span inlet guide vane 402 can be coupled to the metal blocker 302 via mechanical fasteners. In some examples, the part span inlet guide vane 402 is integral with, and protrudes from, the metal blocker 302. In some examples, the part span inlet guide vane 402 is coupled to the containment casing 306. When a fan blade 404 of the turbofan engine 400 breaks, the metal blocker 302 prevents fragments of the fan blade 404 from tearing through the abradable layer 320 and/or the trench filler 318 past the aft end 324 of the metal blocker 302. Additionally, the part span inlet guide vane 402 can block fragments of the fan blade 404 that avoid the abradable layer 320. Specifically, the part span inlet guide vane 402 can deflect the fragments toward an aft end of the turbofan engine 400 to minimize or otherwise reduce damage caused by the fragments.

Figure 5:
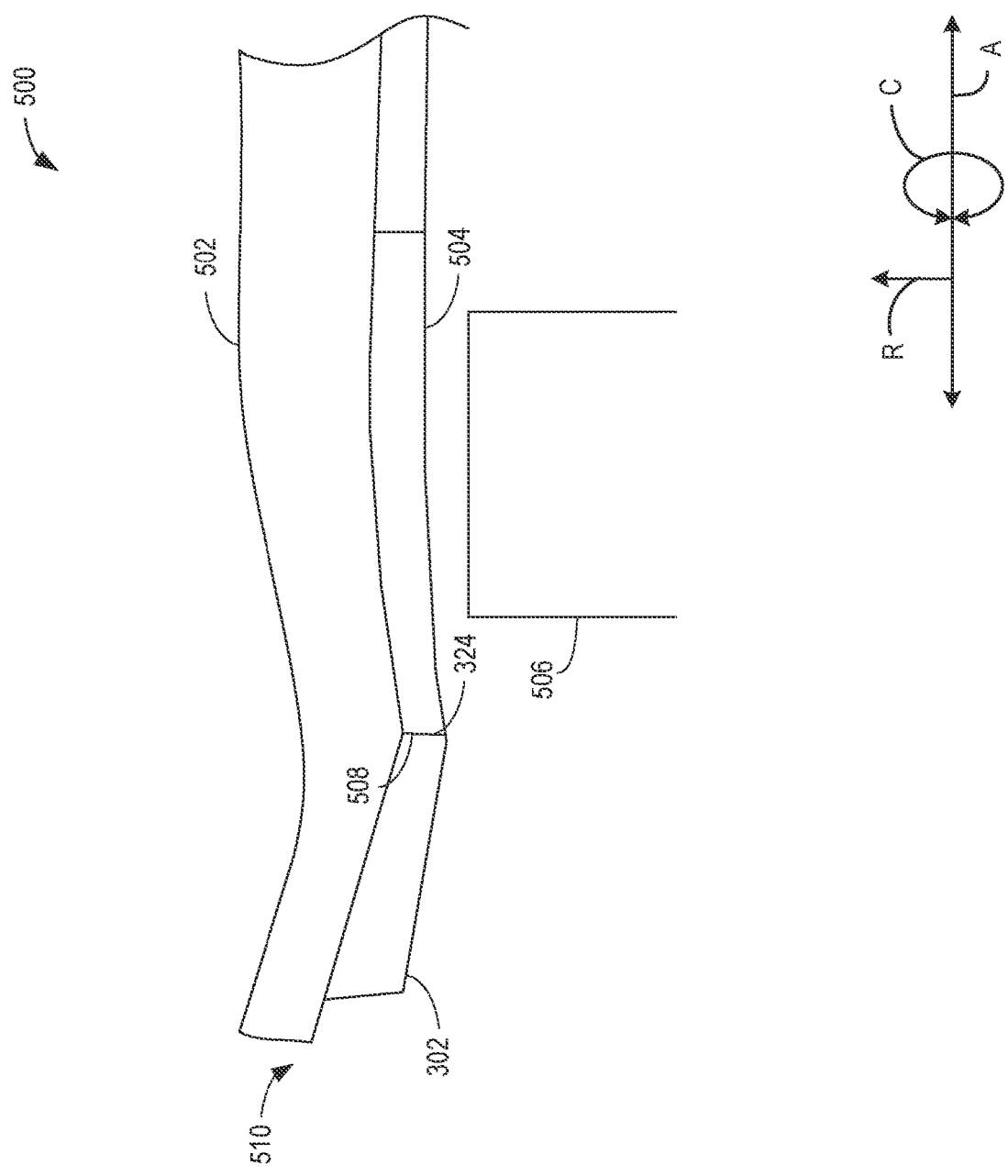
FIG. 5 illustrates a partial cross-sectional view of another example turbofan engine having the example blade blocking apparatus of FIGS. 3 and/or 4.

FIG. 5 illustrates a partial cross-sectional view of another example turbofan engine 500 including the example metal blocker 302 of FIGS. 3 and/or 4. In the illustrated example of FIG. 5, the turbofan engine 500 includes a containment casing 502, an abradable layer 504 coupled to the containment casing 502, and a fan 506. In FIG. 5, the metal blocker 302 is coupled to the containment casing 502 forward of the abradable layer 504. Specifically, the aft end 324 of the metal blocker 302 is proximate to a forward end 508 of the abradable layer 504. As such, when an FBO event occurs, the metal blocker 302 blocks fragments of the fan 506 that travel through the abradable layer 504 toward a forward end 510 of the turbofan engine 500 and, thus, prevents a forward release of the fragments. The aft end 324 of the metal blocker 302 can have various geometric configurations to maintain the fragments of the fan 506 embedded within the abradable layer 504, as discussed in association with FIGS. 6A-D.

FIGS. 6A-D illustrate example configurations of the aft end 324 (FIGS. 3 and 5) of the metal blocker 302. Specifically, different geometric configurations of the aft end 324 of the metal blocker 302 may be utilized in association with different turbofan engines and/or different fan blades. For example, the configuration of the aft end 324 of the metal blocker 302 can be based on a shape and/or a material of the fan blade (e.g., the fan blades 316, the fan blade 404, the fan 506, etc.), an operating speed of the fan, whether the turbofan engine includes a trench filler (e.g., the trench filler 318), a shape and/or a material of the trench filler, and/or a shape and/or material of the abradable layer (e.g., the abradable layer 320, the abradable layer 504).

Figure 6A:
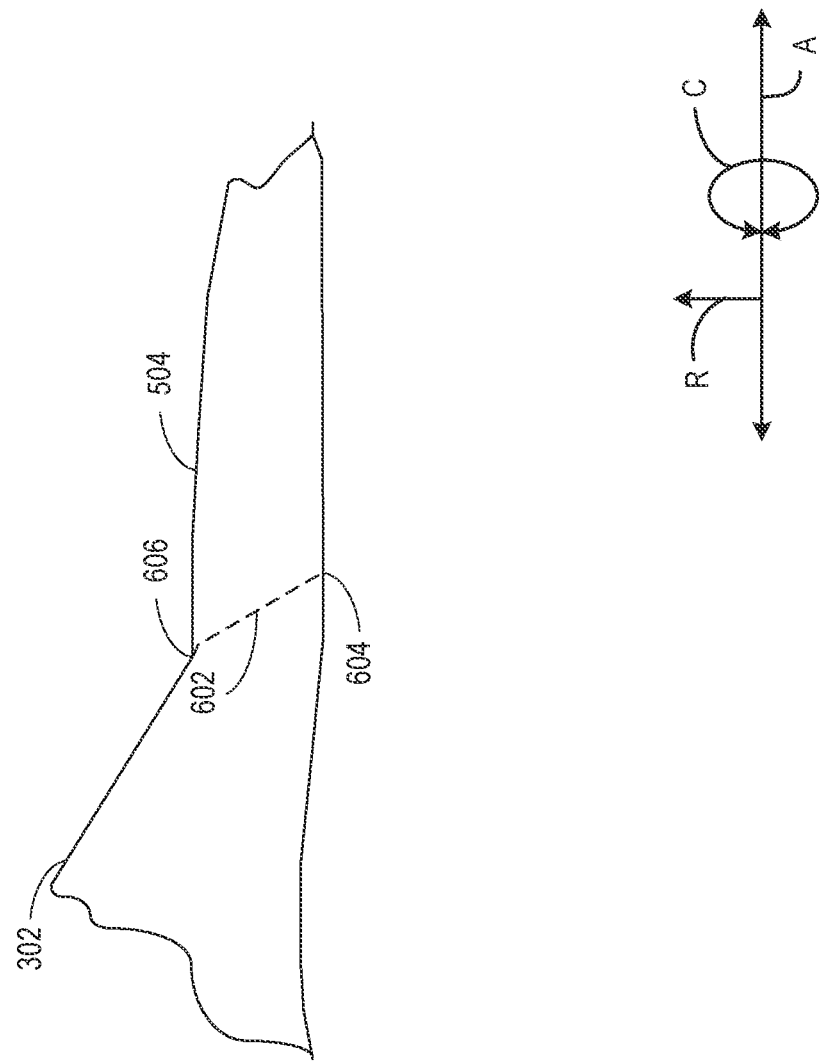
FIG. 6A illustrates a magnified view of a first example configuration of an aft end of the example blade blocking apparatus of FIGS. 3, 4, and/or 5.

FIG. 6A illustrates a first example aft end 602 of the example metal blocker 302 of FIGS. 3, 4, and/or 5. In FIG. 6A, the first aft end 602 is canted. Specifically, the first aft end 602 includes an inner radial edge 604 and an outer radial edge 606. In FIG. 6A, the outer radial edge 606 is positioned forward of the inner radial edge 604. As such, when an FBO event occurs and fragments travel through the abradable layer 504, the first aft end 602 deflects fragments radially outward and maintains the fragments within the abradable layer 504. As such, the first aft end 602 prevents fragments from deflecting into an axial flow path (e.g., the axial flow path 314) of the turbofan engine 500.

Figure 6B:
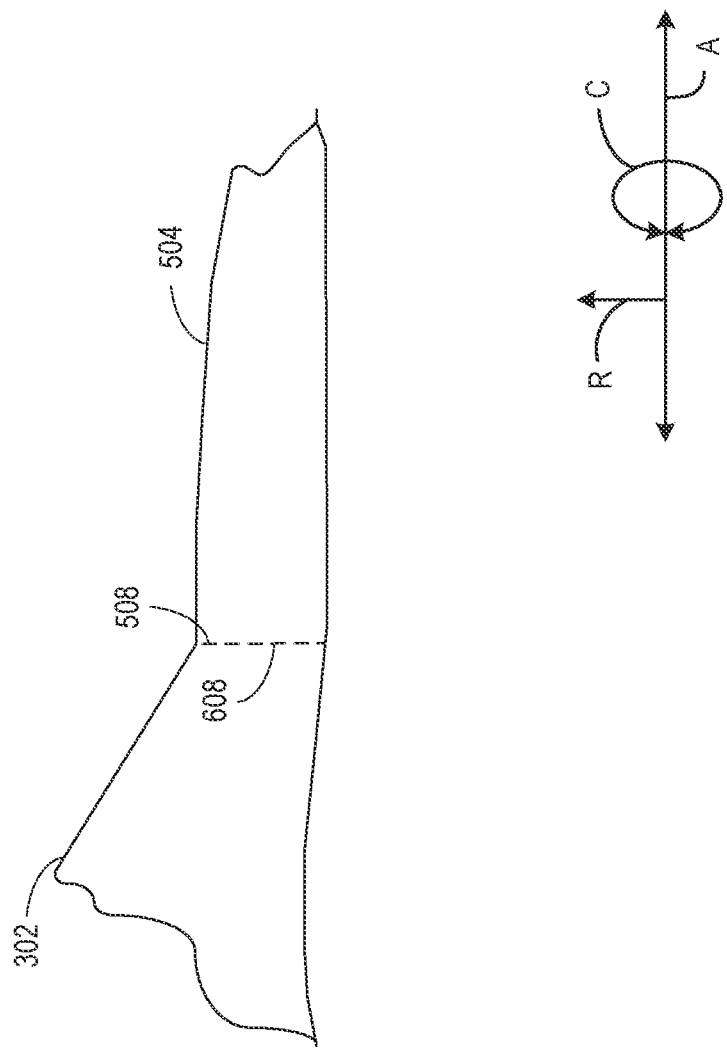
FIG. 6B illustrates a magnified view of a second example configuration of an aft end of the example blade blocking apparatus of FIGS. 3, 4, and/or 5.

FIG. 6B illustrates a second example aft end 608 of the metal blocker 302 of FIGS. 3, 4, and/or 5. In FIG. 6B, the second aft end 608 is substantially parallel to a rotational plane of the fan 506. In other words, the second aft end 608 spans in the radial direction R. As such, the second aft end 608 blocks the fragments from traveling past the forward end 508 of the abradable layer 504 and, in turn, prevents an uncontained forward release of the fragments. In particular, the second aft end 608 is typically utilized when fragments of fan blades are unlikely to ricochet off of an inner radial surface of the containment casing when traveling through the trench filler and/or abradable layer as such fragments are unlikely to deflect back towards the axial flow path of the turbofan engine.

Figure 6C:
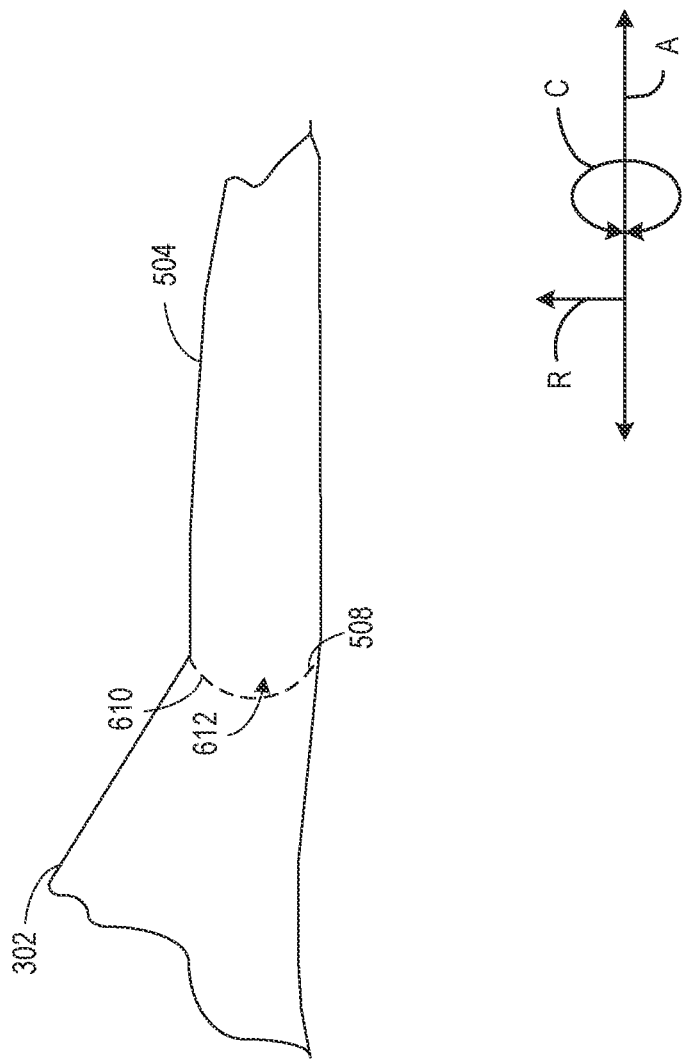
FIG. 6C illustrates a magnified view of a third example configuration of an aft end of the example blade blocking apparatus of FIGS. 3, 4, and/or 5.

FIG. 6C illustrates a third example aft end 610 of the metal blocker 302 of FIGS. 3, 4, and/or 5. In FIG. 6C, the third aft end 610 is concave. In other words, the third aft end 610 includes curvature that defines an indent 612 in the metal blocker 302 extending toward a forward end (e.g., the forward end 305, the forward end 510) of the turbofan engine of FIGS. 3, 4, and/or 5. Accordingly, the abradable layer 504 is proximate to the third aft end 610 and fills the indent 612. As such, the third aft end 610 provides more space for the abradable layer 504 to absorb energy from the fragments (e.g., as the fragments pass through the abradable layer 504) while also preventing the fragments from passing the forward end 508 of the abradable layer 504.

Figure 6D:
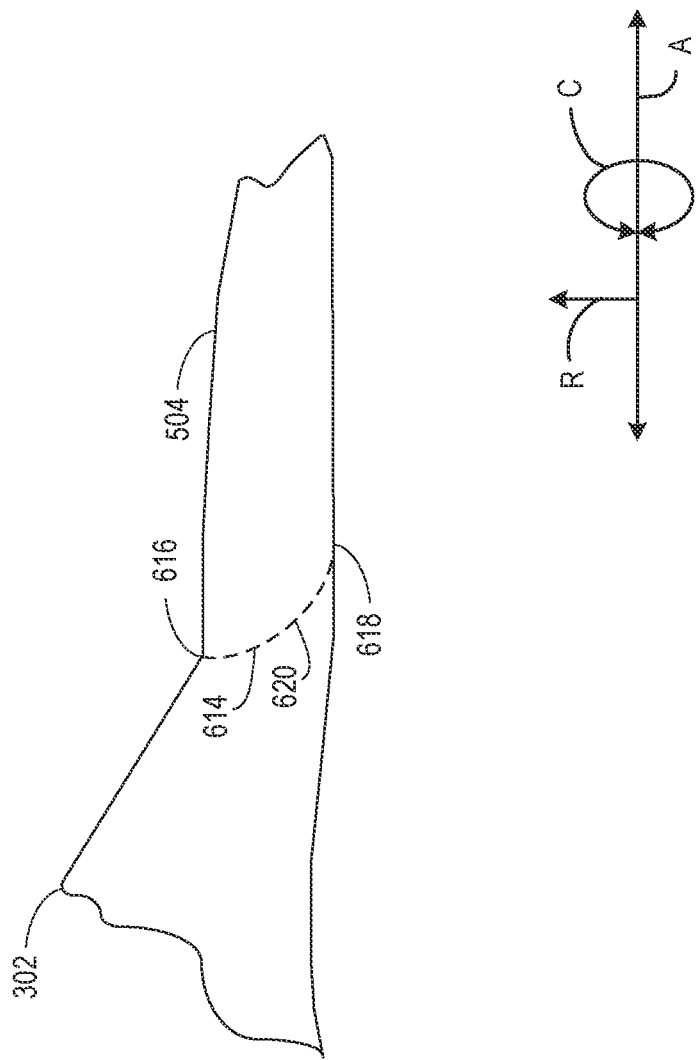
FIG. 6D illustrates a magnified view of a fourth example configuration of an aft end of the example blade blocking apparatus of FIGS. 3, 4, and/or 5.

FIG. 6D illustrates a fourth example aft end 614 of the metal blocker 302 of FIGS. 3, 4, and/or 5. In FIG. 6D, the fourth aft end 614 is a hybrid between the first aft end 602 and the third aft end 610 of FIGS. 6A and 6C. In FIG. 6D, the fourth aft end 614 includes an outer radial edge 616, an inner radial edge 618, and a midsection 620 between the outer radial edge 616 and the inner radial edge 618. In FIG. 6D, the inner radial edge 618 is positioned aft of the outer radial edge 616. In FIG. 6D, the midsection 620 is curved to enable the abradable layer 504 to extend past the inner radial edge 618 and, thus, provide a larger area for the abradable layer 504 to absorb energy from the fragments passing therethrough. Additionally, the midsection 620 is contoured such that a half parabola curve is formed with a slope of the curve increasing from the inner radial edge 618 to the outer radial edge 616. As such, the steeper slope of the midsection 620 closer to the outer radial edge 616 prevents the fragments from being deflected radially outward and into the containment casing and, instead, is contoured to guide the fragments back through the energy absorbing abradable layer 504. Additionally, the flatter slope of the midsection 620 closer to the inner radial edge 618 enables the metal blocker 302 to prevent the fragments from entering the flow path of the turbofan engine over a larger area while still enabling the abradable layer 504 to be positioned across a larger volume for increased energy absorption.

FIGS. 7A-D illustrate example axial views of the example turbofan engines 300, 400, 500 of FIGS. 3, 4 and/or 5. For example, FIGS. 7A-D can be cross-sectional views of the turbofan engines 300, 400, 500 viewed through an inlet of the turbofan engine. Specifically, FIGS. 7A-D illustrate example configurations of a plurality of the metal blocker 302 spanning along an inner radial surface of an associated containment casing (e.g., the inner radial surface 310 of the containment casing 306 of FIG. 3). In FIGS. 7A-D, the inner radial surfaces 312 of the plurality of the metal blocker 302 are flush (e.g., smooth, even, level, etc.) in the circumferential direction C.

FIG. 7A illustrates a first configuration 702 of the plurality of the metal blocker 302 of FIGS. 3, 4, 5, 6A, 6B, and/or 6C. In FIG. 7A, the first configuration 702 includes a first blocker segment 704 and a second blocker segment 706. The first blocker segment 704 and the second blocker segment 706 are coupled to an associated containment casing (e.g., the nacelle 134 of FIGS. 1 and/or 2, the containment casing 306 of FIGS. 3 and/or 4, the containment casing 502 of FIG. 5). In FIG. 7A, the first blocker segment 704 and the second blocker segment 706 each span approximately 180 degrees. Accordingly, outer radial surfaces 708, 710 of the respective blocker segments 704, 706 are proximate to an inner radial surface of the containment casing. Further, inner radial surfaces 712, 714 of the respective blocker segments 704, 706 define a boundary of a portion of a flow path of an associated turbofan engine (e.g., the turbofan engines 300, 400, 500 of FIGS. 3, 4, and/or 5) forward of a fan (e.g., the fan 316 of FIG. 3, the fan blade 404 of FIG. 4, the fan 506 of FIG. 5). As such, the first blocker segment 704 and the second blocker segment 706 block fragments of fan blades from traveling through an abradable surface (e.g., the abradable layer 320 of FIGS. 3 and/or 4, the abradable layer 504 of FIG. 5) and/or a trench filler (e.g., the trench filler 318 of FIGS. 3 and/or 4) past an aft end of the first and second blocker segments 704, 706. Thus, the first and second blocker segments 704, 706 prevent or otherwise reduce an uncontained forward release of fan blade fragments when a FBO event occurs.

In FIG. 7A, a first circumferential end 716 of the first blocker segment 704 and a second circumferential end 718 of the first blocker segment 704 are proximate to (e.g., interface with) a first circumferential end 720 of the second blocker segment 706 and a second circumferential end 722 of the second blocker segment 706, respectively. In some examples, the first circumferential end 716 of the first blocker segment 704 is coupled to the first circumferential end 720 of the second blocker segment 706. Similarly, the second circumferential end 718 of the first blocker segment 704 can be coupled to the second circumferential end 722 of the second blocker segment 706. In FIG. 7A, the first blocker segment 704 and the second blocker segment 706 include a uniform radial thickness. As such, the inner radial surfaces 712, 714 of the first and second blocker segments 704, 706 are flush and define a smooth flow path boundary.

FIG. 7B illustrates a second example configuration 724 of the plurality of the metal blocker 302. In FIG. 7B, the second configuration 724 includes a first blocker segment 726, a second blocker segment 728, and a third blocker segment 730 each spanning approximately 120 degrees along an inner radial surface of an associated containment casing. Although the first, second, and third blocker segments 726, 728, 730 each span across a reduced portion of an associated containment casing compared to the first and second blocker segments 704, 706 of FIG. 7A, the first, second, and third blocker segments 726, 728, 730 are configured similar to the first and second blocker segments 704, 706 of FIG. 7A. That is, the description associated with the first and second blocker segments 704, 706 of FIG. 7A also relates to the first, second, and third blocker segments 726, 728, 730 of FIG. 7B. As such, the first, second, and third blocker segments 726, 728, 730 collectively prevent fan blade fragments from passing through a forward end of an adjacent abradable layer and/or trench filler towards the forward end of the turbofan engine.

FIG. 7C illustrates a third example configuration 732 of the plurality of the metal blocker 302. In FIG. 7C, the third configuration 732 includes a first blocker segment 734, a second blocker segment 736, a third blocker segment 738, and a fourth blocker segment 740 each spanning approximately 90 degrees along an inner radial surface of an associated containment casing. Although the first, second, third, and fourth blocker segments 734, 736, 738, 740 each span across a reduced portion of an associated containment casing compared to the first and second blocker segments 704, 706 of FIG. 7A, the first, second, third, and fourth blocker segments 734, 736, 738, 740 are configured similar to the first and second blocker segments 704, 706 of FIG. 7A. That is, the description associated with the first and second blocker segments 704, 706 of FIG. 7A also relates to the first, second, third, and fourth blocker segments 734, 736, 738, 740 of FIG. 7C. As such, the first, second, third, and fourth blocker segments 734, 736, 738, 740 collectively prevent fan blade fragments from passing through a forward end of an adjacent abradable layer and/or trench filler towards the forward end of the turbofan engine.

FIG. 7D illustrates a fourth example configuration 742 of the plurality of the metal blocker 302. In FIG. 7D, the fourth configuration 742 includes a first blocker segment 744, a second blocker segment 746, a third blocker segment 748, a fourth blocker segment 750, a fifth blocker segment 752, a sixth blocker segment 754, a seventh blocker segment 756, and an eighth blocker segment 758 each spanning approximately 45 degrees along an inner radial surface of an associated containment casing. Although the first, second, third, fourth, fifth, sixth, seventh, and eighth blocker segments 744, 746, 748, 750, 752, 754, 756, 758 each span across a reduced portion of an associated containment casing compared to the first and second blocker segments 704, 706 of FIG. 7A, the first, second, third, fourth, fifth, sixth, seventh, and eighth blocker segments 744, 746, 748, 750, 752, 754, 756, 758 are configured similar to the first and second blocker segments 704, 706 of FIG. 7A. That is, the description associated with the first and second blocker segments 704, 706 of FIG. 7A also relates to the first, second, third, fourth, fifth, sixth, seventh, and eighth blocker segments 744, 746, 748, 750, 752, 754, 756, 758 of FIG. 7D. As such, the first, second, third, fourth, fifth, sixth, seventh, and eighth blocker segments 744, 746, 748, 750, 752, 754, 756, 758 collectively prevent fan blade fragments from passing through a forward end of an adjacent abradable layer and/or trench filler towards the forward end of the turbofan engine.

Although the example configurations 702, 724, 732, 742 of the metal blockers 302 of FIGS. 7A-D utilize 1, 2, 4, and 8 of the metal blockers 302, respectively, it should be understood that any number of the metal blockers 302 can be utilized to prevent fan blade fragments from passing through a forward end of an adjacent abradable layer and/or trench filler towards the forward end of the turbofan engine.

FIGS. 8A-D illustrate additional example axial views of the example turbofan engines 300, 400, 500 of FIGS. 3, 4 and/or 5. For example, FIGS. 8A-D can be cross-sectional views of the turbofan engines 300, 400, 500 viewed through an inlet of the turbofan engines 300, 400, 500. Specifically, FIGS. 8A-D illustrate example configurations of a plurality of the metal blocker 302 of FIGS. 3, 4, 5, 6A, 6B, and/or 6C spanning along an inner radial surface of an associated containment casing (e.g., the inner radial surface 310 of the containment casing 306). In FIGS. 8A-D, the inner radial surfaces 312 (FIG. 3) of the plurality of the metal blocker 302 are jagged (e.g., uneven, stepped, saw-toothed, etc.) in the circumferential direction C. That is, in the illustrated examples of FIGS. 8A-D, the metal blockers 302 have a non-uniform thickness.

FIG. 8A illustrates a fifth example configuration 802 of the plurality of the metal blocker 302. In FIG. 8A, the fifth configuration 802 includes a first blocker segment 804 and a second blocker segment 806. In FIG. 8A, the first blocker segment 804 and the second blocker segment 806 each span approximately 180 degrees and are coupled to an associated containment casing (e.g., the nacelle 134 of FIGS. 1 and/or 2, the containment casing 306 of FIGS. 3 and/or 4, or the containment casing 502 of FIG. 5). Accordingly, outer radial surfaces 808, 810 of the respective blocker segments 804, 806 are proximate to an inner radial surface of the containment casing. Further, inner radial surfaces 812, 814 of the respective blocker segments 804, 806 define a boundary of a portion of a flow path of an associated turbofan engine (e.g., the turbofan engines 300, 400, 500 of FIGS. 3, 4, and/or 5) forward of a fan (e.g., the fan 316 of FIGS. 3 and/or 4, the fan 506 of FIG. 5). As such, the first blocker segment 804 and the second blocker segment 806 block fragments of fan blades from traveling through an abradable surface (e.g., the abradable layer 320 of FIGS. 3 and/or 4, the abradable layer 504 of FIG. 5) and/or a trench filler (e.g., the trench filler 318 of FIGS. 3 and/or 4) past an aft end of the first and second blocker segments 804, 806.

In FIG. 8A, the first blocker segment 804 includes a first circumferential end 816 and a second circumferential end 818. Similarly, the second blocker segment 806 includes a first circumferential end 820 positioned proximate to the second circumferential end 818 of the first blocker segment 804 and a second circumferential end 822 positioned proximate to the first circumferential end 816 of the first blocker segment 804. In FIG. 8A, the first and second blocker segments 804, 806 include a first radial thickness T1 at the first circumferential ends 816, 820 and a second radial thickness T2 at the second circumferential ends 818, 822 that is greater than the first radial thickness T1. As such, the first and second blocker segments 804, 806 form ridges 824, 826 along the boundary of the flow path where the first circumferential end 816 of the first blocker segment 804 interfaces with the second circumferential end 822 of the second blocker segment 806 and where the second circumferential end 818 of the first blocker segment 804 interfaces with the first circumferential end 820 of the second blocker segment 806.

In FIG. 8A, when a FBO event occurs where fragments of a fan blade have an axial velocity toward the forward end of the turbofan engine in addition to a circumferential velocity and a radial velocity, the first and second blocker segments 804, 806 obstruct a pathway of the fragments via the ridges 824, 826. Specifically, the ridges 824, 826 span along the axial direction A of the turbofan engine forward of the fan. As such, the ridges 824, 826 enable the first and second blocker segments 804, 806 to absorb energy from the fan blade fragments and, in turn, reduce a velocity thereof in response to the fragments not impacting or entering the abradable layer and/or the trench filler. Specifically, when the fragments are launched forward of the fan during the FBO event, the fragments, having velocities in the axial A, radial R, and circumferential direction C, slide along the inner radial surfaces 812, 814 of the blocker segments 804, 806 and, in turn, the fragments impact the second circumferential ends 818, 822, which absorb energy from the loose fragments and slow the velocities thereof. Accordingly, in an instance where the loose fragments are able to escape through an inlet of the turbofan engine, the blocker segments 804, 806 minimize or otherwise reduce an exit velocity of the fragments and, in turn, reduce an impact force of the fragments when the fragments re-enter the turbofan engine or impact another part of the aircraft.

In FIG. 8A, the first radial thickness T1 at the first circumferential ends 816, 820 of the first and second blocker segments 804, 806 is approximately equivalent to a thickness of an abradable layer and/or a trench filler that an aft end of the blocker segments 804, 806 interfaces with. As such, the blocker segments 804, 806 prevent any fragments that entered the trench filler and/or abradable layer from exiting through a forward end of the trench filler and/or abradable layer, which advantageously enables an attachment of the inlet cowl to the turbofan engine to be maintained despite the uncontained forward release of some fragments. As a result, the first and second blocker segments 804, 806 minimize or otherwise reduce damages resulting from the FBO event.

FIG. 8B illustrates a sixth example configuration 828 of the plurality of the metal blocker 302. In FIG. 8B, the sixth configuration 828 includes a first blocker segment 830, a second blocker segment 832, and a third blocker segment 834 each spanning approximately 120 degrees along an inner radial surface of an associated containment casing. In FIG. 8B, the first, second, and third blocker segments 830, 832, 834 are configured similar to the first and second blocker segments 804, 806 of FIG. 8A. As such, the first, second, and third blocker segments 830, 832, 834 form ridges 836, 838, 840 where the respective blocker segments 830, 832, 834 interface. Accordingly, the description associated with the blocker segments 804, 806 of FIG. 8A also relates to the first, second, and third blocker segments 830, 832, 834 of FIG. 8B with the addition of another ridge 840 to absorb energy from the loose fragments that are launched forward of the trench filler and/or abradable layer in response to an FBO event.

FIG. 8C illustrates a seventh example configuration 842 of the plurality of the metal blocker 302. In FIG. 8C, the seventh configuration 842 includes a first blocker segment 844, a second blocker segment 846, a third blocker segment 848, and a fourth blocker segment 850 each spanning approximately 90 degrees along an inner radial surface of an associated containment casing. In FIG. 8C, the first, second, third, and fourth blocker segments 844, 846, 848, 850 are configured similar to the first and second blocker segments 804, 806 of FIG. 8A. As such, the first, second, third, ad fourth blocker segments 844, 846, 848, 850 form ridges 852, 854, 856, 858 where the respective blocker segments 844, 846, 848, 850 interface. Accordingly, the description associated with the blocker segments 804, 806 of FIG. 8A also relates to the first, second, third, and fourth blocker segments 844, 846, 848, 850 of FIG. 8C with two additional ridges 856, 858 to absorb energy from the loose fragments that are launched forward of the trench filler and/or abradable layer in response to an FBO event.

FIG. 8D illustrates an eighth example configuration 860 of the plurality of the metal blocker 302. In FIG. 8D, the eighth configuration 860 includes a first blocker segment 862, a second blocker segment 864, a third blocker segment 866, a fourth blocker segment 868, a fifth blocker segment 870, a sixth blocker segment 872, a seventh blocker segment 874, and an eighth blocker segment 876 each spanning approximately 45 degrees along an inner radial surface of an associated containment casing. In FIG. 8D, the first, second, third, fourth, fifth, sixth, seventh, and eighth blocker segments 862, 864, 866, 868, 870, 872, 874, 876 are configured similar to the first and second blocker segments 804, 806 of FIG. 8A. As such, the first, second, third, fourth, fifth, sixth, seventh, and eighth blocker segments 862, 864, 866, 868, 870, 872, 874, 876 form ridges 878, 880, 882, 884, 886, 888, 890, 892 where the respective blocker segments 862, 864, 866, 868, 870, 872, 874, 876 interface. Accordingly, the description associated with the blocker segments 804, 806 of FIG. 8A also relates to the first, second, third, fourth, fifth, sixth, seventh, and eighth blocker segments 862, 864, 866, 868, 870, 872, 874, 876 with six additional ridges 882, 884, 886, 888, 890, 892 to absorb energy from the loose fragments that are launched forward of the trench filler and/or abradable layer in response to an FBO event.

Although the example configurations 802, 828, 842, 860 of the plurality of the metal blocker 302 of FIGS. 8A-D utilize 1, 2, 4, and 8 of the metal blocker 302, respectively, it should be understood that any number of the metal blocker 302 can be utilized to prevent fan blade fragments from passing through a forward end of an adjacent abradable layer and/or trench filler towards the forward end of the turbofan engine while also absorbing energy from the loose fragments that are launched forward of and do not impact the trench filler and/or abradable layer in response to an FBO event.

In some examples, the apparatus includes means for receiving fragments from the fan in response to a fan blade out event, the means for receiving fragments at least partially aligned with the fan in an axial direction defined by the turbofan engine. For example, the means for receiving fragments may be implemented by the abradable layer 320, 504 and/or the trench filler 318.

In some examples the apparatus includes means for blocking the fragments from traveling through the means for receiving fragments past a forward end of the means for receiving fragments, the means for blocking the fragments disposed forward of the fan in the axial direction, an aft end of the means for blocking the fragments proximate to the forward end of the means for receiving. For examples, the means for blocking the fragments from traveling through the means for receiving fragments past a forward end of the means for receiving fragments may be implemented by the metal blocker 302 and/or the blocker segments 704, 706, 726, 728, 730, 734, 736, 738, 740, 744, 746, 748, 750, 752, 754, 756, 758, 804, 806, 830, 832, 834, 844, 846, 848, 850, 862, 864, 866, 868, 870, 872, 874, 876.

In some examples, the means for blocking the fragments from traveling through the means for receiving includes means for deflecting the fragments in response to the fragments not impacting the means for receiving fragments, the means for deflecting the fragments defining a portion of a boundary of a flow path of the turbofan engine. For example, the means for deflecting the fragments may be implemented by the ridges 824, 826, 836, 838, 840, 852, 854, 856, 858, 878, 880, 882, 884, 886, 888, 890, 892.

The foregoing examples of the metal blocker and/or metal blocker segments can be used with turbofan engines. Although each example turbofan engine disclosed above has certain features, it should be understood that it is not necessary for a particular feature of one example can end to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

As used herein in the context of describing the position and/or orientation of a first object relative to a second object, the term "substantially parallel" encompasses the term parallel and more broadly encompasses a meaning whereby the first object is positioned and/or oriented relative to the second object at an absolute angle of no more than ten degrees (10°) from parallel. For example, a first axis that is substantially parallel to a second axis is positioned and/or oriented relative to the second axis at an absolute angle of no more than ten degrees (10°) from parallel.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

From the foregoing, it will be appreciated that example systems, methods, apparatus, and articles of manufacture have been disclosed that block fan blade fragmentation from a forward release through an abradable layer and/or trench filler. Accordingly, the example systems, methods, apparatus, and articles of manufacture maintain fan blade fragmentation that impacts the abradable layer and/or trench filler embedded in the abradable layer and/or trench filler to minimize or otherwise reduce damage that results from a FBO event. Additionally, the example systems, methods, apparatus, and articles of manufacture impact and absorb energy from fan blade fragmentation that is launched forward of the abradable layer and/or trench filler in response to the FBO event to minimize or otherwise reduce damage caused by such fan blade fragmentation.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

Further aspects of the disclosure are provided by the subject matter of the following clauses:

A turbofan engine comprising: a containment casing, a fan, at least one of a trench filler or an abradable layer at least partially aligned with the fan in an axial direction defined by the turbofan engine, at least one of the trench filler or the abradable layer fixed to an inner radial surface of the containment casing, and a metal blocker coupled to the containment casing forward of the fan, an aft end of the metal blocker interfacing with at least one of the trench filler or the abradable layer.

The turbofan engine of any preceding clause, wherein a thickness of the metal blocker is at least equal to a thickness of a forward end of the at least one of the trench filler or the abradable layer.

The turbofan engine of any preceding clause, wherein the metal blocker includes solid walls and at least one of a cavity or an internal structure between the solid walls.

The turbofan engine of any preceding clause, wherein the metal blocker includes a first circumferential end having a first thickness and a second circumferential end having a second thickness, the first thickness greater than the second thickness.

The turbofan engine of any preceding clause, wherein the metal blocker includes a uniform radial thickness.

The turbofan engine of any preceding clause, wherein the aft end of the metal blocker is positioned forward of an aft end of an inlet cowl associated with the containment casing.

The turbofan engine of any preceding clause, wherein the aft end of the metal blocker is substantially parallel to a rotational plane of the fan.

The turbofan engine of any preceding clause, wherein the aft end of the metal blocker includes an inner radial edge, an outer radial edge, and a midsection, the midsection including curvature extending forward of the inner radial edge and the outer radial edge.

The turbofan engine of any preceding clause, wherein the aft end of the metal blocker includes an inner radial edge and an outer radial edge, the outer radial edge positioned forward of the inner radial edge.

The turbofan engine of any preceding clause, wherein the aft end of the metal blocker includes a midsection between the inner radial edge and the outer radial edge, the midsection including curvature.

An aircraft engine comprising: a nacelle, fan blades, at least one of a trench filler or an abradable layer, and metal blocker segments coupled to the nacelle, the metal blocker segments defining a boundary of a flow path of the aircraft engine forward of the fan blades, aft ends of the metal blocker segments to interface with at least one of the trench filler or the abradable layer, the metal blocker segments to block fragments of the fan blades from escaping the aircraft engine through a forward end of the aircraft engine in response to the fragments impacting at least one of the trench filler or the abradable layer.

The aircraft engine of any preceding clause, wherein inner radial surfaces of the metal blocker segments define a boundary of an axial flow path of the aircraft engine forward of the fan blades.

The aircraft engine of any preceding clause, wherein inner radial surfaces of the metal blocker segments are flush in a circumferential direction defined by the aircraft engine.

The aircraft engine of any preceding clause, wherein inner radial surfaces of the metal blocker segments are jagged or stepped in a circumferential direction defined by the aircraft engine to form ridges at interfaces between the metal blocker segments, the ridges spanning along an axial direction defined by the aircraft engine.

The aircraft engine of any preceding clause, wherein the metal blocker segments are coupled to the nacelle via mechanical fasteners.

The aircraft engine of any preceding clause, wherein the aft ends of the metal blocker segments are concave to define an indent, at least one of the trench filler or the abradable layer to be positioned in the indent.

The aircraft engine of any preceding clause, wherein the aft ends of the metal blocker segments are canted.

A turbofan engine comprising: a containment casing, a fan, means for receiving fragments from the fan in response to a fan blade out event, the means for receiving fragments at least partially aligned with the fan in an axial direction defined by the turbofan engine, and means for blocking the fragments from traveling through the means for receiving fragments past a forward end of the means for receiving fragments, the means for blocking the fragments disposed forward of the fan in the axial direction, an aft end of the means for blocking the fragments proximate to the forward end of the means for receiving.

The turbofan engine of any preceding clause, wherein the means for blocking the fragments includes a means for deflecting the fragments in response to the fragments not impacting the means for receiving fragments, the means for deflecting the fragments defining a portion of a boundary of a flow path of the turbofan engine.

The turbofan engine of any preceding clause, wherein the means for blocking the fragments includes a first circumferential end having a first thickness and a second circumferential end having a second thickness different from the first thickness.

What is claimed is:

1. A turbofan engine comprising:
    a containment casing;
    a compressor;
    a fan forward of the compressor;
    at least one of a trench filler or an abradable layer at least partially aligned with the fan in an axial direction defined by the turbofan engine, at least one of the trench filler or the abradable layer fixed to an inner radial surface of the containment casing; and
    a metal blocker coupled to the containment casing forward of the fan, an aft end of the metal blocker interfacing with a forward end of at least one of the trench filler or the abradable layer.

2. The turbofan engine of claim 1, wherein a thickness of the metal blocker is at least equal to a thickness of a forward end of the at least one of the trench filler or the abradable layer.

3. The turbofan engine of claim 1, wherein the metal blocker includes solid walls and at least one of a cavity or an internal structure between the solid walls.

4. The turbofan engine of claim 1, wherein the metal blocker includes a first circumferential end having a first thickness and a second circumferential end having a second thickness, the first thickness greater than the second thickness.

5. The turbofan engine of claim 1, wherein the metal blocker includes a uniform radial thickness.

6. The turbofan engine of claim 1, wherein the aft end of the metal blocker is positioned between the fan and an aft end of an inlet cowl associated with the containment casing.

7. The turbofan engine of claim 1, wherein the aft end of the metal blocker is substantially parallel to a rotational plane of the fan.

8. The turbofan engine of claim 1, wherein the aft end of the metal blocker includes an inner radial edge, an outer radial edge, and a midsection, the midsection including curvature extending forward of the inner radial edge and the outer radial edge.

9. The turbofan engine of claim 1, wherein the aft end of the metal blocker includes an inner radial edge and an outer radial edge, the outer radial edge positioned forward of the inner radial edge.

10. The turbofan engine of claim 9, wherein the aft end of the metal blocker includes a midsection between the inner radial edge and the outer radial edge, the midsection including curvature.

11. An aircraft engine comprising:
    a compressor including stator vanes and rotor blades;
    a tubular casing positioned around the compressor;
    a nacelle positioned around the tubular casing;
    fan blades forward of the compressor and the tubular casing;
    at least one of a trench filler or an abradable layer fixed to an inner radial surface of the nacelle; and
    metal blocker segments coupled to the nacelle, the metal blocker segments defining a boundary of a flow path of the aircraft engine forward of the fan blades, aft ends of the metal blocker segments to interface with at least one of the trench filler or the abradable layer, the metal blocker segments to block fragments of the fan blades from escaping the aircraft engine through a forward end of the aircraft engine in response to the fragments impacting at least one of the trench filler or the abradable layer.

12. The aircraft engine of claim 11, wherein inner radial surfaces of the metal blocker segments define a boundary of an axial flow path of the aircraft engine forward of the fan blades.

13. The aircraft engine of claim 11, wherein inner radial surfaces of the metal blocker segments are flush in a circumferential direction defined by the aircraft engine.

14. The aircraft engine of claim 11, wherein inner radial surfaces of the metal blocker segments are jagged or stepped in a circumferential direction defined by the aircraft engine to form ridges at interfaces between the metal blocker segments, the ridges spanning along an axial direction defined by the aircraft engine.

15. The aircraft engine of claim 11, wherein the metal blocker segments are coupled to the nacelle via mechanical fasteners.

16. The aircraft engine of claim 11, wherein the aft ends of the metal blocker segments are concave to define an indent, at least one of the trench filler or the abradable layer to be positioned in the indent.

17. The aircraft engine of claim 11, wherein the aft ends of the metal blocker segments are canted.

18. A turbofan engine comprising:
a containment casing;
a fan upstream of a compressor;
means for receiving fragments from the fan in response to a fan blade out event, the means for receiving fragments at least partially aligned with the fan in an axial direction defined by the turbofan engine;
means for blocking the fragments from traveling through the means for receiving fragments past a forward end of the means for receiving fragments radially inward of the containment casing, the means for blocking the fragments disposed forward of the fan in the axial direction, an aft end of the means for blocking the fragments proximate to the forward end of the means for receiving.

19. The turbofan engine of claim 18, wherein the means for blocking the fragments includes a means for deflecting the fragments in response to the fragments not impacting the means for receiving fragments, the means for deflecting the fragments defining a portion of a boundary of a flow path of the turbofan engine.

20. The turbofan engine of claim 18, wherein the means for blocking the fragments includes a first circumferential end having a first thickness and a second circumferential end having a second thickness different from the first thickness.

* * * * *